(12) United States Patent
Sulzyc (10) Patent No.: US 8,858,667 B2
(45) Date of Patent: Oct. 14, 2014

(54) COUPLING HEAD WITH A FILTER ELEMENT

(75) Inventor: Georg Sulzyc, Edingen-Neckarhausen (DE)

(73) Assignee: Haldex Brake Products GmbH, Heidelberg (DE)

( * ) Notice: Subject to any disclaimer, the term of this patent is extended or adjusted under 35 U.S.C. 154(b) by 159 days.

(21) Appl. No.: 13/447,723

(22) Filed: Apr. 16, 2012

(65) Prior Publication Data
US 2012/0260615 A1    Oct. 18, 2012

(30) Foreign Application Priority Data
Apr. 18, 2011    (DE) .......................... 10 2011 002 129

(51) Int. Cl.
*B01D 46/00*    (2006.01)
*B60T 17/04*    (2006.01)

(52) U.S. Cl.
CPC ................................... *B60T 17/043* (2013.01)
USPC ................... 55/309; 55/307; 55/311; 55/313; 55/385.1; 55/484; 95/210; 95/211; 95/213

(58) Field of Classification Search
USPC ........ 55/309, 307, 311–313, 385.1, 484, 529; 95/210–211, 213
See application file for complete search history.

(56) References Cited

U.S. PATENT DOCUMENTS

| | | | |
|---|---|---|---|
| 6,846,408 B2 | 1/2005 | Knight | |
| 2003/0089345 A1* | 5/2003 | Itou et al. ...................... | 123/520 |
| 2005/0235614 A1* | 10/2005 | Smith .............................. | 55/309 |
| 2006/0123743 A1* | 6/2006 | Heer ............................... | 55/309 |
| 2011/0286167 A1* | 11/2011 | Winkler .................... | 361/679.01 |

FOREIGN PATENT DOCUMENTS

| | | |
|---|---|---|
| CH | 317732 | 11/1956 |
| DE | 1767438 U | 3/1958 |
| DE | 2037008 | 2/1972 |
| DE | 19514224 A1 | 10/1996 |
| DE | 19931162 B4 | 1/2001 |
| DE | 102005009016 A1 | 9/2005 |
| EP | 0737502 B1 | 8/1996 |
| EP | 2281700 A1 | 8/2010 |
| GB | 2 446 948 A | 2/2007 |

OTHER PUBLICATIONS

European Search Report in co-pending, related EP Application No. 121636369.1, mailed Oct. 31, 2013.

* cited by examiner

*Primary Examiner* — Robert Clemente
*Assistant Examiner* — Karla Hawkins
(74) *Attorney, Agent, or Firm* — Thomas | Horstemeyer, LLP (57) ABSTRACT

The present invention relates to a coupling head for coupling a towing vehicle to a trailer.
According to the invention, in the coupling head a filter element is used. The filter element is bypassed by a continuously open by-pass. Preferably, the path through the by-pass has at least one redirection in the region of an undercut. As a result of the redirection, contaminants in the compressed air are not or not fully transferred through the by-pass. The by-pass might also ensure a supply of compressed air to the trailer, for example, when the filter element is at least partly blocked due to the contaminants. According to the invention, a valve element used to open the by-pass in the case of increasing blockage of the filter element is not required.

23 Claims, 11 Drawing Sheets

COUPLING HEAD WITH A FILTER ELEMENT

CROSS REFERENCE TO RELATED APPLICATIONS

This application claims priority to co-pending German Patent Application No. DE 10 2011 002 129.9 entitled "Kupplungskopf mit einem Filterelement", filed Apr. 18, 2011.

FIELD OF THE INVENTION

The invention relates to a coupling head for a commercial vehicle having a filter element. Compressed air flows through the filter element which in particular is designed as a filter insert. Coupling heads of this kind are used for pneumatically charging a compressed air system of a commercial vehicle, in particular a unit of a multiple unit commercial vehicle or tractor-trailer-combination. Here, compressed air is fed, for example via a coupling head, to supply the compressed air system of a trailer with compressed air and/or to deliver a control pressure, in particular for a brake actuation.

BACKGROUND

CH 317732 discloses a coupling head (also called "Glad hand") assigned to a towing vehicle and a coupling head assigned to a trailer, which each have a mussel shell shape with an overlapping flange, by means of which the two coupling heads can be pneumatically connected to one another in a sealing manner. Each coupling head has a sealing ring, these sealing rings being pressed against one another to seal the coupling heads. A non-return valve, which blocks in the direction towards the trailer, is integrated into the coupling head on the towing vehicle side. This non-return valve is, when both coupling heads are fitted, automatically transferred into a permanent open position wherein this transfer is controlled by the movement via a cam drive. A filter element has the form of a screen basket with compressed air flowing therethrough. The filter element serves to collect contaminants. The filter element is integrated into the coupling head on the trailer side.

DE 1 767 438 U (which relates to another technical field) describes a coupling head for railway vehicles, into which a sealing ring is integrated. The sealing ring consists of an annular body made of rubber or a rubber-like material. The sealing ring has an inner annular groove, into which a thin cover is inserted. The thin cover is divided by slots, running radially, into flexible sectors in the form of circular segments having the same segment angles. When the coupling head is not pressurized, the circular segments due to their stiffness are held in an plane orientation in relation to one another, whereby the coupling head is closed in outward direction. In the coupled state and with compressed air applied, the circular segments bend in the direction of flow without producing a relevant resistance against the flow of the compressed air.

DE-OS 2 037 008 discloses coupling heads for a two or multiple line compressed air braking system for operating a trailer. Between the tractor and the trailer detachable connections by coupling heads are required for a supply line, a brake control line and also, where appropriate, an auxiliary brake line. The coupling head on the towing vehicle side and assigned to the supply line has a sealing and control piston which is tensioned via a spring into a shut-off position when no coupling head is fitted on the trailer side. When coupled to the coupling head on the trailing side via a ring seal of the coupling head on the trailer side, the sealing and control piston is transferred from a shut-off position into an open position, which is effected against the tensioning by the spring. The sealing and control piston has an inclined or cam surface. Via this inclined or cam surface the sealing or control piston on the way from the shut-off position to the open position actuates a stem of a shut-off valve of the coupling head on the towing vehicle side into the opening direction of the shut-off valve. The seal of the coupling head on the trailer side is formed as an elastic ring seal. The elastic ring seal is pressed onto the upper surface of the sealing and control piston of the coupling head on the towing vehicle side when the coupling heads are twisted with each other. The coupled position of the coupling heads is secured by bayonet elements. The seal of the coupling head on the trailer side has an L-shaped semi-longitudinal section. One leg of the L is oriented parallel to the longitudinal axis and forms a guiding surface for the compressed air flow. The other leg of the L extends radially outwards and is accommodated and held in a form-fit manner by a housing of the coupling head on the trailer side. The coupling head on the towing vehicle side and assigned to the brake control line, generally also has a sealing and control piston which interacts with the seal with the L-shaped semi-longitudinal section of the coupling head on the trailer side. Here, however, the sealing and control piston is additionally equipped with a valve seat which together with a valve body forms a shut-off valve. The coupling head on the towing vehicle side comprises a control piston located in a control chamber. The control chamber is coupled to the coupling head on the towing vehicle side and assigned to the supply line, and is located downstream of the shut-off valve of this coupling head. The control piston is designed as a differential piston, on which both the brake control pressure on the towing vehicle side and the supply line pressure downstream of the shut-off valve act. If the connection of both of the coupling heads assigned to the supply line is detached and as a result the pressure in the control chamber drops down, this pressure drop and a closing movement of the control piston result in a shut-off of the shut-off valve in the coupling head on the tow vehicle side and assigned to the brake control line. This is done by pressing the valve body against the assigned valve seat. Here, the coupling heads are referred to as "automatic coupling heads".

DE 199 31 162 B4 underlines the importance of the use of filter elements in coupling heads in order to protect compressed air braking systems and auxiliary consumers in commercial vehicles from contaminants. Here, the filter element is in each case integrated into the coupling head of the trailer. The coupling heads of the trailer, in contrast to those of the towing vehicle, have no stop valve or shut-off valve which in the uncoupled state causes the assigned pneumatic line to close. The filter element is generally situated in a separate housing. However, also embodiments are known, in which a cup-shaped filter insert opens against the force of a pretensioning pressure spring and frees a by-pass connection. This by-pass connection is only freed if the filter element is sufficiently blocked with contaminative particles such that upstream of the filter element the required opening pressure for the by-pass connection is produced. With the opening of the by-pass connection, it is accepted that contaminated compressed air might be transferred to the trailer. DE 199 31 162 B4 discloses a coupling head having a housing, an upper claw, a cover and a guide element, wherein claw and guide element serve to connect and guide the other assigned coupling head when assemblying or detaching the coupling heads. A spring element formed as a filter insert is inserted into the coupling head. The filter insert is formed with a cage-like base body. The interior space of the base body is freely accessible through an internal bore of a ring surface in the direction of flow of the compressed air, while an escape from the interior space in the direction of flow is only possible through the screen made of a fine-meshed, plastic filter material. The filter material is bonded to the filter insert cage or fused as a result of a heat treatment. The ring surface is formed by a ring of the cage. A first pressure spring is supported at the ring of the cage on one side. On the ring on the opposite side a stop ring is supported which is acted upon by a second pressure spring opposed to the first pressure spring. The stop ring is a valve body for a double valve in which, in a closed position of a first valve, the valve body tightly contacts the ring and, in a closed position of the second valve, tightly contacts a valve seat formed by the housing of the coupling head, which is arranged radially outwardly from the ring. If the filter insert is not blocked due to contaminants, both valves are closed. If with increasing blockage of the filter insert a greater pressure builds up upstream of the filter insert, this pressure when exceeding an opening pressure lifts the filter insert together with the stop ring under the additional bias of the second pressure spring from the valve seat formed by the housing. Accordingly, a by-pass is created dependent on the build-up of pressure and on the amount of blockage. The coupling head is, however, also adapted for a reverse direction of flow, for which, when there is no contamination of the filter insert, the compressed air must also flow through the filter insert. If a pressure decrease builds up for this reverse direction of flow with a blockage of the filter insert, a by-pass can also be brought into effect for the reverse flow, which in this case is provided by opening the first valve. Under the additional bias of the first pressure spring, the filter insert with the ring is moved away from the stop ring, whereby a by-pass in the form of a cross-over section is created between the ring and the stop ring. DE 199 31 162 B4 discloses different embodiments and installation options for the filter insert and the double valve. The assembly of the coupling head requires the insertion of two pressure springs, the filter insert and the stop ring into an interior space of the housing. Subsequently the interior space must then be closed with a screwed-in cover comprising an additional sealing element. Alternatively, instead of using a cover which is screwed in, the use of an alternative cover having a quickly detachable securing ring or another securing wire is suggested in this document. Detaching the cover serves to allow access to the interior of the coupling head, so that the filter insert might be replaced quickly after it has become clogged or so that the pressure springs can be replaced.

EP 2 281 700 A1 is also based on the fundamental idea of opening a valve for a by-pass when there is an increase in pressure upstream due to an increased restriction effect of a blocked filter insert. In this case, the valve is formed with a valve lip of the seal. When there is no throttle effect due to a blockage the seal tightly abuts a limiting ring of the filter insert. However, the seal elastically deforms when due to the restriction effect there is an increase in the pressure above an opening pressure, so that the by-pass is freed.

OBJECT OF THE INVENTION

The invention is based on the object to provide a coupling head for a commercial vehicle having a filter element (in particular a filter insert) which (taking account of production and/or assembly costs and effort) allows for the possibility of an at least partial blockage of the filter insert as a result of contaminated compressed air conveyed through the filter element.

SUMMARY OF THE INVENTION

The present invention is based on the perception that the person skilled in the art, in accordance with the prior art mentioned above, proceeds from the preconception that for "normal operation" of the coupling head with a clean filter element (i.e. a filter element which is not or not sufficiently blocked) the presence of a by-pass which bypasses the filter element is to be avoided as far as possible. On the other hand, a by-pass is required which must be selectively brought into effect, when a blockage or partial clogging of the filter element occurs. However, the by-pass should not impair the functioning of the compressed air system by an at least partial closure or increased restriction of the cross-over section for the compressed air in the coupling head. In the worst case, this partial closure or restriction could lead to an inadequate braking action of the commercial vehicle with the risk of an accident, an immobilisation of the vehicle or the need for the filter element to be replaced or cleaned.

According to the invention, it was recognized for the first time that the by-pass bypassing the filter element can be permanently open. According to the invention, the additional design measures required according to the prior art for enabling the pressure and clogging controlled opening of a by-pass can then be omitted. Thus, in particular pressure springs for acting on a valve element in a closed position, valve seats and the like, which are known from the prior art mentioned above, can be dispensed with.

In addition, forming the seal according to EP 2 281 700 A1 with an elastic valve lip can, in some cases, also be omitted, whereby the production of this seal can be simplified. Furthermore, a problem with the embodiments known from this prior art is that providing the seal with the valve lip represents a deviation from standardized sealing rings, such as those prescribed in ISO 1728 for coupling heads. The dimensional stability of the sealing lip presents a further problem. Due to aging or other effects, the behaviour of the material can change over the course of time, whereby a creeping increase or reduction in the opening pressure for the by-pass can occur. All these problems can be eliminated according to the invention.

Basically, for one embodiment, the invention suggests a division of the compressed air flows in a first flow through the filter element and in a second flow through the permanently open by-pass. The relation between the two flows might be fixed or also dependent on the degree of the extent of the blockage of the filter element. To simply name a non-limiting example, basically a restriction effect for the filter element which is not or not sufficiently blocked can be less than the restriction effect for the by-pass, so that without exceeding a certain degree of contamination of the filter element a certain proportion or a large part of the compressed air does not bypass the filter element via the by-pass but flows through the filter element. In so doing, passing on a certain amount of contamination through the by-pass can, in some cases be, accepted.

The by-pass is preferably a free and open channel. However, in terms of the present invention, a by-pass should also be included under a "permanently open by-pass", in which possibly filtering (in particular reduced filtering with reduced throttling effect with respect to the filter element) also might take place, as long as here no switchable valve element opens closes the by-pass. In addition, it is understood that the by-pass according to the invention can have any geometry of flow, wherein the by-pass can be formed with at least one by-pass opening to admit the compressed air to enter into the by-pass and/or with at least one by-pass channel.

A further embodiment of the invention additionally takes care that the extent of the contaminants which could bypass the filter element via the by-pass is kept to an acceptable level. For this embodiment, basically the compressed air is guided over a guiding surface in a guiding direction, wherein the guiding direction can, for example, be directed in the direction of the filter element. The by-pass has (at least) one by-pass opening for admitting the compressed air to enter into the by-pass. The by-pass opening is arranged in such a way that the compressed air does not directly reach the by-pass opening in the guiding direction which would mean that the compressed air flow with the contaminants would be able to reach the by-pass opening. Instead, the by-pass opening is arranged in such a way that the compressed air can only reach the by-pass opening from the guiding surface by being redirected from the guiding direction. The redirection can be effected by corresponding conducting elements or guiding surfaces. The invention also covers an at least partial redirection of the flow to the by-pass opening by pneumatic forces, in particular by the flow conditions in the coupling head. It is also possible for the compressed air not to reach the by-pass opening directly via the flow, but rather to reach the by-pass opening in a region of reduced flow as a result of the pressure conditions. The redirection referred to results in the contaminants contained in the flow owing to their inertia being redirected less or not at all. Accordingly a separation of air and contaminants occurs such that compressed air with contaminants originally oriented in the guiding direction is divided into contaminants which do not reach the by-pass opening and compressed air which reaches the by-pass opening without contaminants or only with a reduced proportion of contaminants. It is understood that within the scope of the present invention, a complete separation of the compressed air, on the one hand, and the contaminants, on the other hand, does not necessarily have to take place. Instead, the proportion of contaminants reaching the by-pass opening can be reduced by the redirection. It is also possible for only heavier contaminants to be kept away from the by-pass opening by the redirection, while lighter or smaller contaminants, which conceivably do not impair operation of the compressed air system, are directed to the by-pass opening by the redirection. The by-pass opening can be "covered" in the flow or guiding direction, so that the compressed air with the contaminants can only reach the by-pass opening "around the corner", namely around the cover.

Any type of embodiment might be used for inducing the redirection. For one embodiment of the invention, the by-pass opening is formed in the region of an undercut or in a back tapered region. This can be arranged at any position, for example in the flow channels of the compressed air or inlet regions of chambers. To simply name a few non-limiting examples, the undercut might (at least partly) be formed with the seal which is responsible for sealing the coupling of the two assigned coupling heads. For another example the undercut is (at least partly) formed with a housing of the coupling head. Also embodiments are possible, in which the undercut is formed together with the seal and the housing.

In a further embodiment of the invention, the by-pass is formed with at least one by-pass channel and/or at least one by-pass opening. Here, the by-pass channels and/or by-pass openings can be arranged arbitrarily in the flow channels. These can also be arranged at different positions along the direction of flow. For one particular proposal of the invention, the by-pass channels or by-pass openings are distributed over the circumference of a line or flow cross-section, wherein the distribution can occur evenly or unevenly. By-pass openings and/or by-pass channels can be employed which can all have the same or different cross-sectional and/or longitudinal forms.

There are various possibilities for the type of flow guidance when the redirection is carried out. In one particular embodiment of the invention, the flow conditions in the coupling head for an at least partly blocked filter element are specified in such a way that the compressed air reaches the by-pass and/or flows through it via the following partial flow regions:
From a guiding flow in the region of a guiding surface, the compressed air flow is initially redirected in the region of a redirection flow, in which region contaminants can already be eliminated.
The prevention of contaminants passing through the by-pass can be increased if another redirection occurs, but this time in another direction, in a region of a counter redirection flow.
A turning region is arranged between the region of the redirection flow and the region of the counter redirection flow.

In principle, the redirection can take place along any curved flow courses, wherein flow contours for bringing about the redirection can also be provided with projections, edges and the like. It has proved particularly effective, in some cases, with respect to keeping contaminants from passing through the by-pass, if the compressed air for an at least partly blocked filter element flows through the by-pass in an (roughly approximated) S-shaped flow.

According to a further proposal of the invention, the compressed air flowing through the by-pass must flow around a protrusion, an edge or a projection which extends into the filter element. The compressed air with the contaminants contained therein must thereby already enter the interior of the filter element, in particular the filter insert. The compressed air can only reach the by-pass if it flows back around the protrusion, the edge or the projection again. This flow back is accompanied by a large change in direction right up to a reversal in the sense of direction. Contaminants here strive to continue the direction of flow into the filter element and not to participate in the above mentioned change in the direction of flow. Accordingly, the contaminants do not reach, or only to a reduced extent reach, the by-pass.

The invention comprises embodiments, in which the contours delimiting the flow are independent of the flow conditions. For another proposal of the invention, however, a contour effect occurs which is dependent on the flow conditions. An elastic guiding or passing element is provided for this embodiment. The guiding or passing element can, in some cases, be elastically deformed by the flow of the compressed air dependent on a flow speed, a volumetric flow or a pressure. In a further embodiment of the invention, the extent of the elastic deformation of the guiding or passing element alters the extent of the redirection of the compressed air on the way to the at least one by-pass opening of the by-pass.

Guiding or passing elements of this kind can be built by elastic circular segments. For example corresponding to the prior art DE 1 767 438 U these elastic circular segments might be closed when they are not flowed through, but undergo bending in an opening direction when flowed through. Where guiding or passing elements in the form of elastic ring segments are used, these segments delimit a permanently free circular cross-section which can be flowed through independently of an elastic deformation of the ring segments for further opening of the free cross section.

It is possible for the guiding or passing element to be formed as a separate component. According to a particular proposal of the invention, however, at least one guiding or passing element is an integral component of the seal which is responsible for the sealing connection when coupling the two coupling heads to one another. This embodiment is based on the understanding that the elasticity of the seal (which can consist of a single material or a composite material) can be used in a multifunctional way: on the one hand the seal is used for the required elastic sealing of the two coupling heads whereas on the other hand the seal is used for the elastic deformability of the guiding or passing element. Furthermore, for this embodiment of the invention the range of parts is reduced and hence also the production, stocking and assembly costs and effort are reduced.

Whilst, in principle, any configuration of the seal with regard to the shape and structure might be used, a seal according to ISO 1728 for coupling heads can also be used within the scope of the invention.

The filter element can be secured in place by any method, in particular by a pretension, with a certain play or with a fixation of the filter element. A particularly compact configuration is produced if the filter element in a coupling head according to the invention is secured in place by the seal. The seal hence takes on another function. As a further advantage, securing the filter element in place is "automatically" dispensed when removing the seal (for example in the course of maintenance with cyclical replacement of the seal). In the case of a seal which is detached, the filter element can then possibly be removed from the coupling head without further disassemblying steps, whereby the filter element can then be cleaned particularly easily or can be replaced by a new filter element.

According to a further embodiment of the invention, (at least) one collecting space for contaminants is provided in the coupling head. For one embodiment the filter element or the filter insert forms the collecting space. This is due to the fact that the compressed air as such is guided in the guiding direction to the filter insert and compressed air reaches the by-pass opening due to the redirection, while contaminants are deposited in the interior of the filter insert (which hence forms the collecting space). This embodiment might have the advantage that when cleaning or replacing the filter element, contaminants located therein can also be removed. However, it is also possible that on the way to the by-pass or in the by-pass itself additional collecting spaces are built with recesses, grooves, undercuts and the like, in which, for example as a result of redirections, the contaminants can be deposited, so that they are not transported further.

Advantageous further embodiments of the invention result from the claims, the description and the drawings. The advantages of features and of combinations of several features mentioned above are only provided by way of example and can alternatively or cumulatively come into effect. However, the mentioned advantages not necessarily have to be achieved by embodiments according to the invention. Further features are to be derived from the drawings—in particular from the illustrated geometries and the relative dimensions of a plurality of components in relation to one another and their relative arrangement and operative connection. The combination of features of different embodiments of the invention or of features of different claims is also possible and is hereby encouraged. This also relates to those features which are illustrated in separate drawings or are mentioned in the description thereof. These features can also be combined with features of different claims. Equally, features specified in the claims can be omitted for further embodiments.

The features mentioned in the claims and the description are in terms of their number to be understood such that exactly this number or a larger number than the stated number is present, without necessarily requiring the explicit use of the adverb "at least". Therefore if, for example, a by-pass channel is mentioned, this is to be understood such that exactly one by-pass channel, two or more by-pass channels might be present.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention is explained and described further below by means of preferred exemplary embodiments illustrated in the figures.

DETAILED DESCRIPTION

The coupling head 1 according to the invention can be used as a coupling head for any pneumatic coupling, in particular for a supply line or a brake control line of a towing vehicle or a trailer. It is by all means possible, in addition to the features disclosed below, for further components and technical functions to be integrated into the coupling head, such as those for example explained for the prior art mentioned at the outset, e.g. stop valves or the like. The flow through the coupling head 1 in one direction is described below. This can constitute the only direction of the flow through the coupling head. However, it is also quite possible for the coupling head to be used with an opposing direction of flow, see also in particular the embodiments relating to this in DE 199 31 162 B4, wherein in this case the measures according to the invention with the redirection of the compressed air flow only take effect in one direction of flow or alternatively preferably by means of additional measures in both directions of flow.

Figure 1:
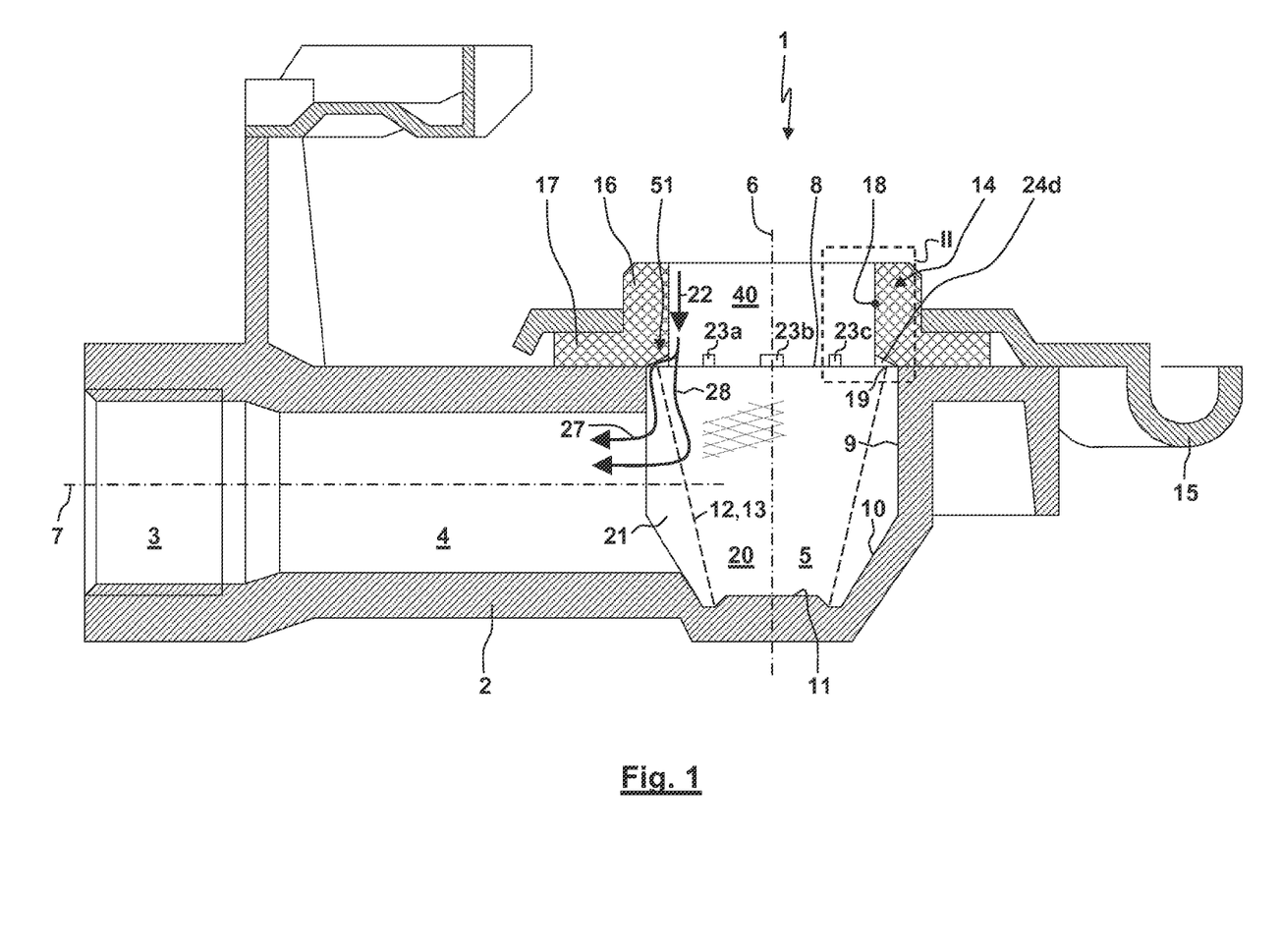
FIG. 1 shows a first embodiment of a coupling head according to the invention in a vertical section.

The coupling head 1 according to FIG. 1 has a housing 2 which for the illustrated exemplary embodiment integrally forms a connection region 3, a straight pneumatic line region 4 and a chamber 5 which has a longitudinal axis 6. The longitudinal axis 6 is oriented transverse to the longitudinal axis 7 of the connection region 3 and the line 4. The line 4 runs laterally into the chamber 5. The chamber 5 only has one further opening 8 to the top and in the direction of the longitudinal axis 6. Preferably, the housing is formed as a cast part.

For the exemplary embodiment illustrated in FIG. 1, the upper half of the chamber 5 is formed with a cylindrical enveloping surface 9. The chamber 5 tapers in a straight line with a truncated cone-shaped enveloping surface 10 to a base region 11 of the chamber 5. A filter element 12, here in the form of a filter insert 13, is inserted into the chamber 5.

The filter insert 13 can be of any design, for instance also corresponding to the filter insert with cage and screen according to DE 199 31 162 B4. The contour of the filter insert 13 is, for example, formed rotationally symmetrically to the longitudinal axis 6. For the exemplary embodiment illustrated, the filter insert 13 has a truncated cone-shaped geometry and is supported on the base region 11.

An elastomeric, elastic seal 14 is pressed from above onto the housing 2 and ensures a pneumatically tight connection between the seal 14 and the housing 2 in the region of the opening 8. A guide element 15 can also be identified in FIG. 1, like the one also described in DE 199 31 162 B4.

The seal 14 is formed in an L-shape in half-section, having one leg 16 oriented parallel to the longitudinal axis 6 and one leg 17 oriented transverse to the longitudinal axis 6 and extending outwards from the leg 16. The leg 16 delimits a cylindrical inner wall which forms a guiding surface 18 for the compressed air flowing in. The guiding surface 18 is arranged inside the upper edge 19 of the filter insert 13 (radially inside with respect to the longitudinal axis 3). Preferably, the seal 14 abuts under elastic pretension in the direction of the longitudinal axis 6 on the edge 19 of the filter insert 13, whereby the filter insert 13 is fixed in place at least in the direction of the longitudinal axis 6. For the exemplary embodiment illustrated in FIG. 1, the base region 11 is formed with an elevation which can fit into a corresponding depression in the filter insert 13 in a form-fit manner, whereby the filter insert 13 is also guided in lateral direction. In the chamber 5, an interior space 20 of the filter insert is separated by the filter insert from a cross-over space 21. The cross-over space 21 is delimited radially on the inner side by the filter insert 13 and radially on the outer side by the housing 2 with the enveloping surfaces 9, 10.

Compressed air flows guided through the guiding surface 18 in a guiding direction 22 into the interior space 20 and through the filter insert 13 to the cross-over space 21, from which the compressed air reaches the line 4.

Figure 2:
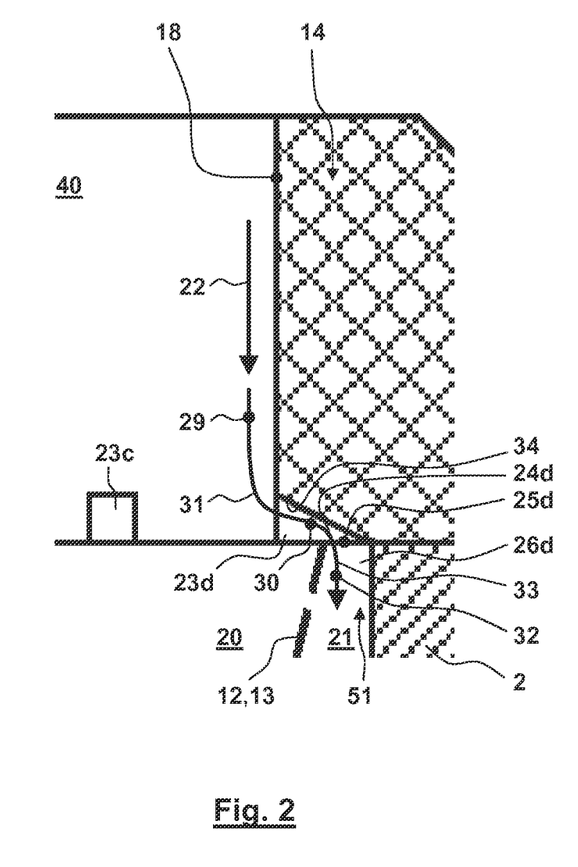
FIG. 2 shows a detail II of FIG. 1, in which the flow through the coupling head according to the invention is illustrated.

In the region of an inner corner or edge of the seal 14, the seal has a plurality of recesses 23 distributed over the circumference, each of which forms an undercut 24 of the guiding surface 18 (FIG. 2). The undercuts 24 lead to by-pass openings 25 which are formed between the edge 19 of the filter insert 13 and the enveloping surface 9 or the seal 14. The by-pass openings 25 run into by-pass channels 26 which run into the cross-over space 21 or are formed with it. (In the figures, the pluralities of recesses 23, undercuts 24, by-pass openings 25 and by-pass channels 26 are in some cases differentiated by supplementing letters a, b, c, d.)

In FIG. 1, the arrows 27, 28 illustrate that the compressed air reaches the cross-over space 21 and the line 4 from the guiding direction 22 via two alternative paths, namely, on the one hand, through the filter insert 13 and,
on the other hand, by bypassing the filter insert 13 through the by-pass openings 25 and the by-pass channels 26.

The redirection which must be present so that compressed air can enter from the guiding direction 22 through the by-pass opening 25 into the by-pass channel 26 is illustrated in FIG. 2 with the arrows. Firstly, the flow is redirected away from the longitudinal axis 6 in a redirection region 31 downstream from a flow region 29. Before reaching a turning region 30 due to the redirection a flow component directed radially outwards increases in size. By contrast, downstream from the turning region 30 as far as a flow region 32, a redirection occurs in the opposite direction in a counter redirection region 33. Here, the flow component is directed radially outwards decreasing in size. The flow is hence guided "around the corner" with the result that contaminants contained in the compressed air do not follow the flow path of the compressed air outlined in FIG. 2 with the redirection region 31 and the counter redirection region 33, but rather enter the interior space 20 of the filter insert 13 where these can be deposited. It is to be understood that the flow path outlined in FIG. 2 is only an exemplary illustration. Other flow paths are also possible without altering the design, for which, for example, the compressed air first enters the interior space of the filter insert 13 and the redirection only then takes place in such a way that the compressed air exits again from the interior space 20 and reaches the by-pass channel 26 via the by-pass opening 25. It can be identified in FIG. 2 that the redirection in the redirection region 31 does not occur by means of a physical guiding contour but rather by pneumatic forces.

For the exemplary embodiment illustrated in FIGS. 1 and 2, the recesses 23 have a rectangular or square cross-section, wherein the height of the recesses decreases in radial outward direction. E.g. the recess 23d is in the detail section according to FIG. 2 formed in the fashion of a chamfer 34. Away from the recesses 23, the seal 16 abuts on the edge 19 of the filter insert 13 under pretension.

For the following exemplary embodiments, components and their design features are identified by the same reference numerals as those used in FIGS. 1 and 2, provided that these in terms of their design and/or function at least partly correspond or are comparable to the components and design features denoted with this reference numeral according to FIGS. 1 and 2.

Figure 3:
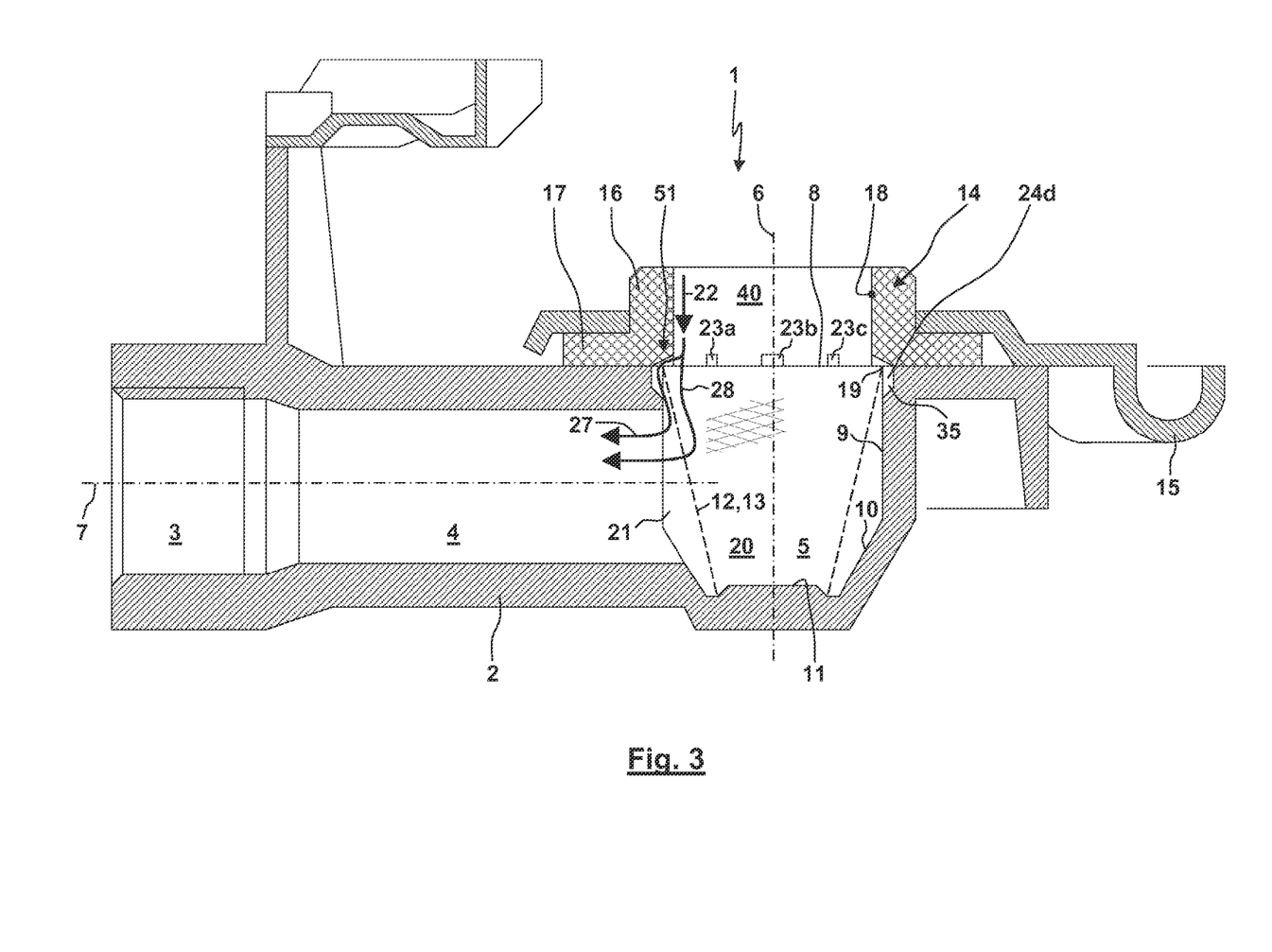
FIGS. 3 and 4 show further embodiments of coupling heads according to the invention in a vertical section.

The embodiment according to FIG. 3 substantially corresponds to the embodiment according to FIGS. 1 and 2. However, here the housing 2 has at least one recess 35 in the upper end region of the enveloping surface 9. It is also possible that one single continuous recess 35 as a kind of annular groove is built in the enveloping surface 9. Alternatively, a plurality of recesses 35 can be provided at circumferential positions which correspond to the circumferential positions of the recesses 23. In this case, the undercuts 24 are formed jointly by the recesses 23 of the seal 14 and the at least one recess 35 of the housing. Accordingly, the recesses 35 can form the by-pass channel 26 and the by-pass opening 25. As illustrated in FIG. 3, in this case the edge 19 of the filter insert 13 can have an outer diameter which (with a transition fit) can correspond to the diameter of the enveloping surface 9, without this resulting in the compressed air not being able to laterally flow past the filter insert 13. It is, however, also possible for a recess 25 to be provided in the enveloping surface 9, if the dimensions of the enveloping surface 9, on the one hand, and of the edge 19 of the filter insert 13 are chosen according to FIG. 1, whereby then the restriction effect of the by-pass opening 25 and the by-pass channel 26 can be reduced, provided that this is desired.

Figure 4:
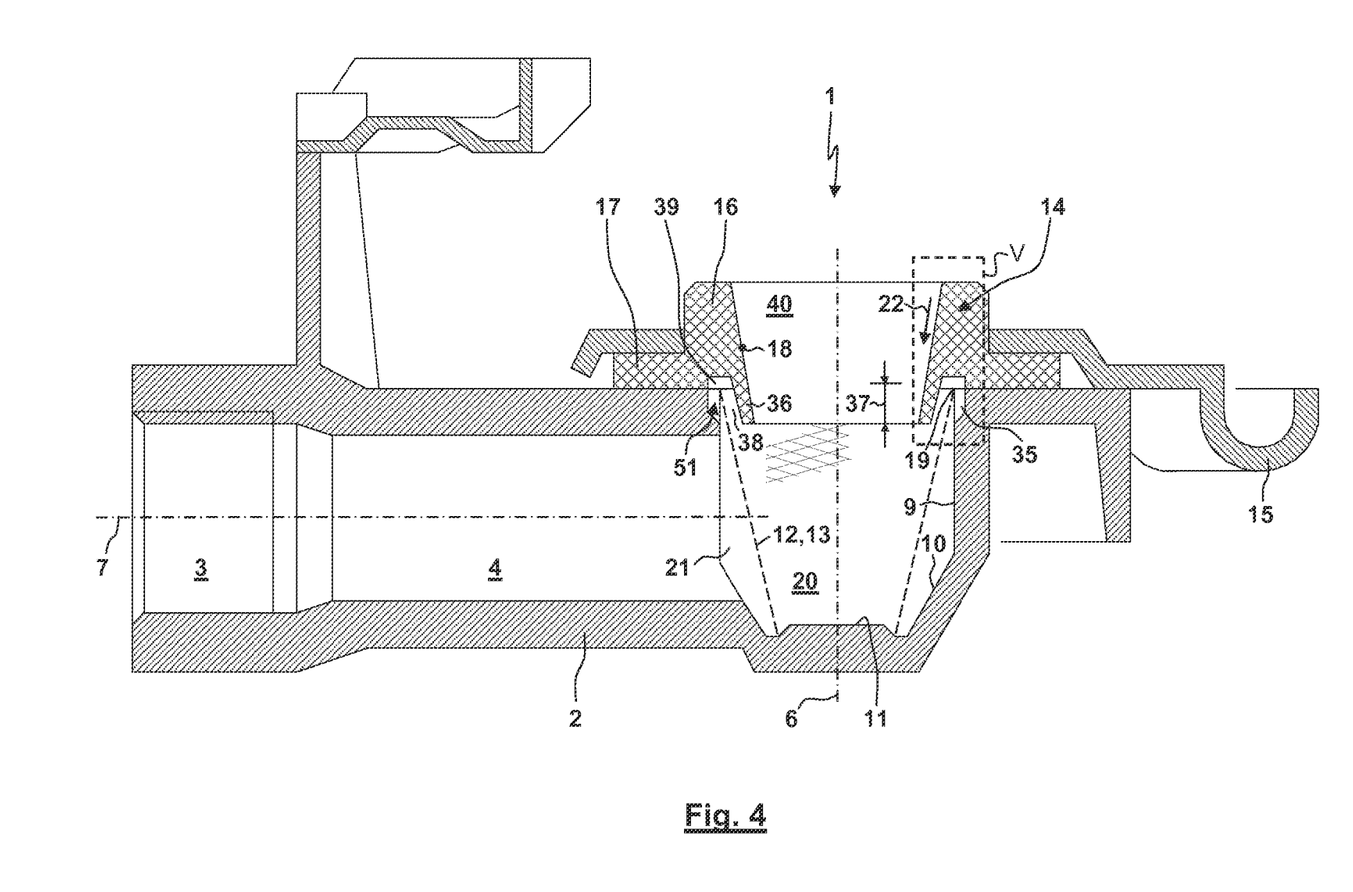
Figure 5:
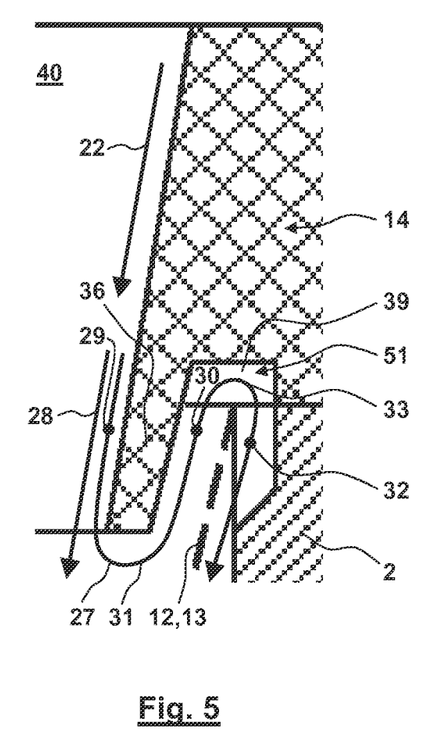
FIG. 5 shows a detail V of FIG. 4, in which the flow through the coupling head according to the invention is illustrated.

According to the exemplary embodiment illustrated in FIGS. 4 and 5, the housing 2 of the coupling head 1 is substantially formed corresponding to FIG. 3. Here, the enveloping surface 9 is also provided with a, for example, circumferential recess 35. Here, however, the seal 16 is not provided with recesses 23 according to the previous figures. Instead, the seal 16 has a circumferential, annular projection 36 which extends with an extension 37 into the interior space 20 of the filter insert 13 and thereby extends the guiding surface 18 into the interior space 20 of the filter insert 13. An annular channel 38 is formed lying radially outside the projection 36. The annular channel 38 is defined by the outer circumference of the projection 36 and the filter insert 13. The annular channel 38 runs into an annular groove 39 introduced into the leg 17 of the seal 14, via which the annular channel 38 is pneumatically connected to the recess 35. For the exemplary embodiment according to FIG. 4, the guiding surface 18 is a (truncated) cone shape tapering in the direction of the filter insert 13, wherein preferably the opening angle of the guiding surface 18 corresponds to the opening angle of the filter insert 13.

FIG. 5 shows the division of the flow of, on the one hand, compressed air with contaminants as per arrow 28 and, on the other hand, compressed air with a reduced proportion of contaminants as per arrow 27. Here a redirection occurs from the flow region 29 via the redirection region 31 to the turning region 30 and the counter redirection region 33 to the flow region 32. Put simply, the redirection can take place according to FIG. 5 in the form of a "horizontal S".

Figure 6:
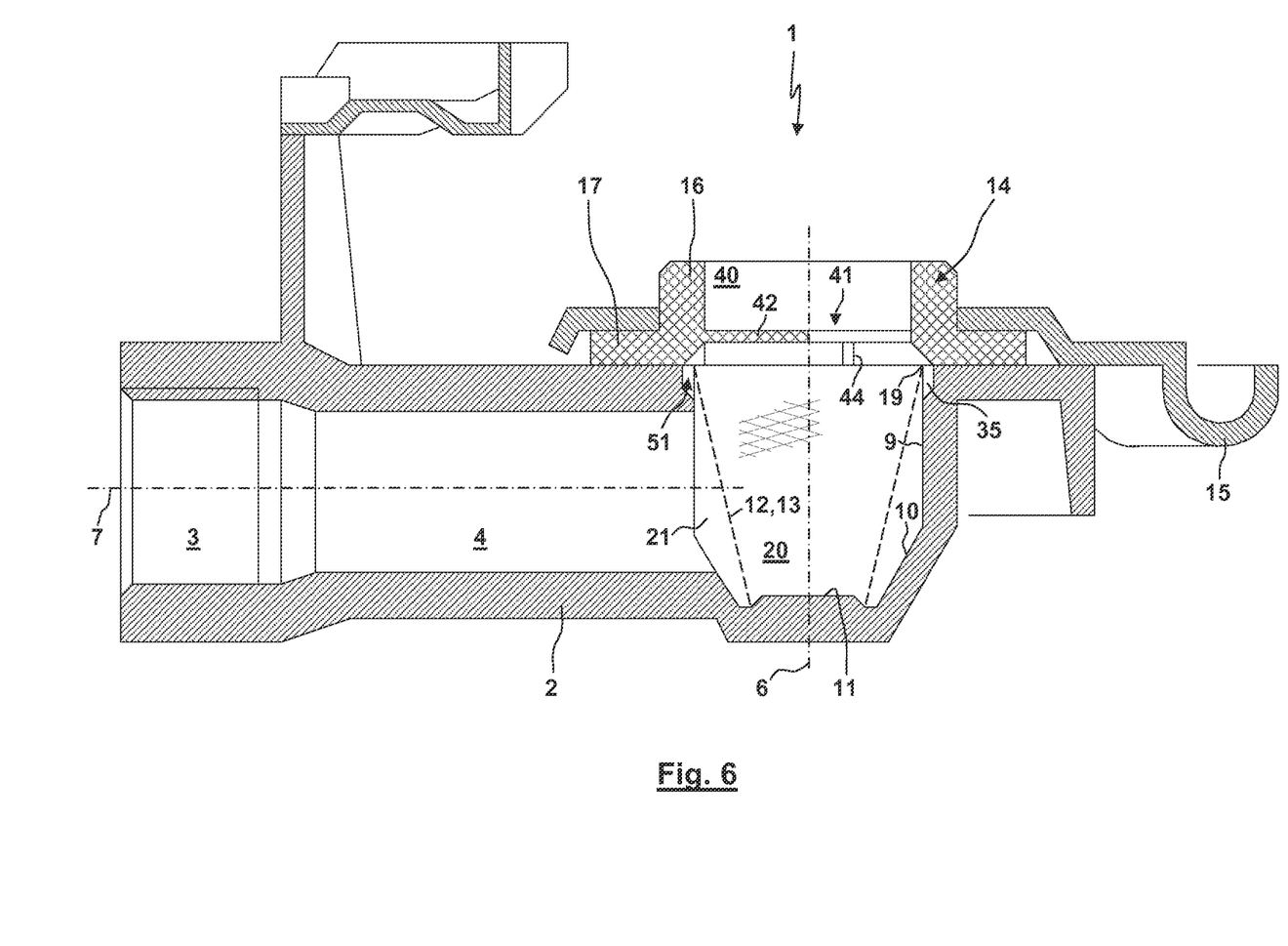
FIGS. 6 and 7 show a further embodiment of a coupling head according to the invention in a vertical section.
Figure 7:
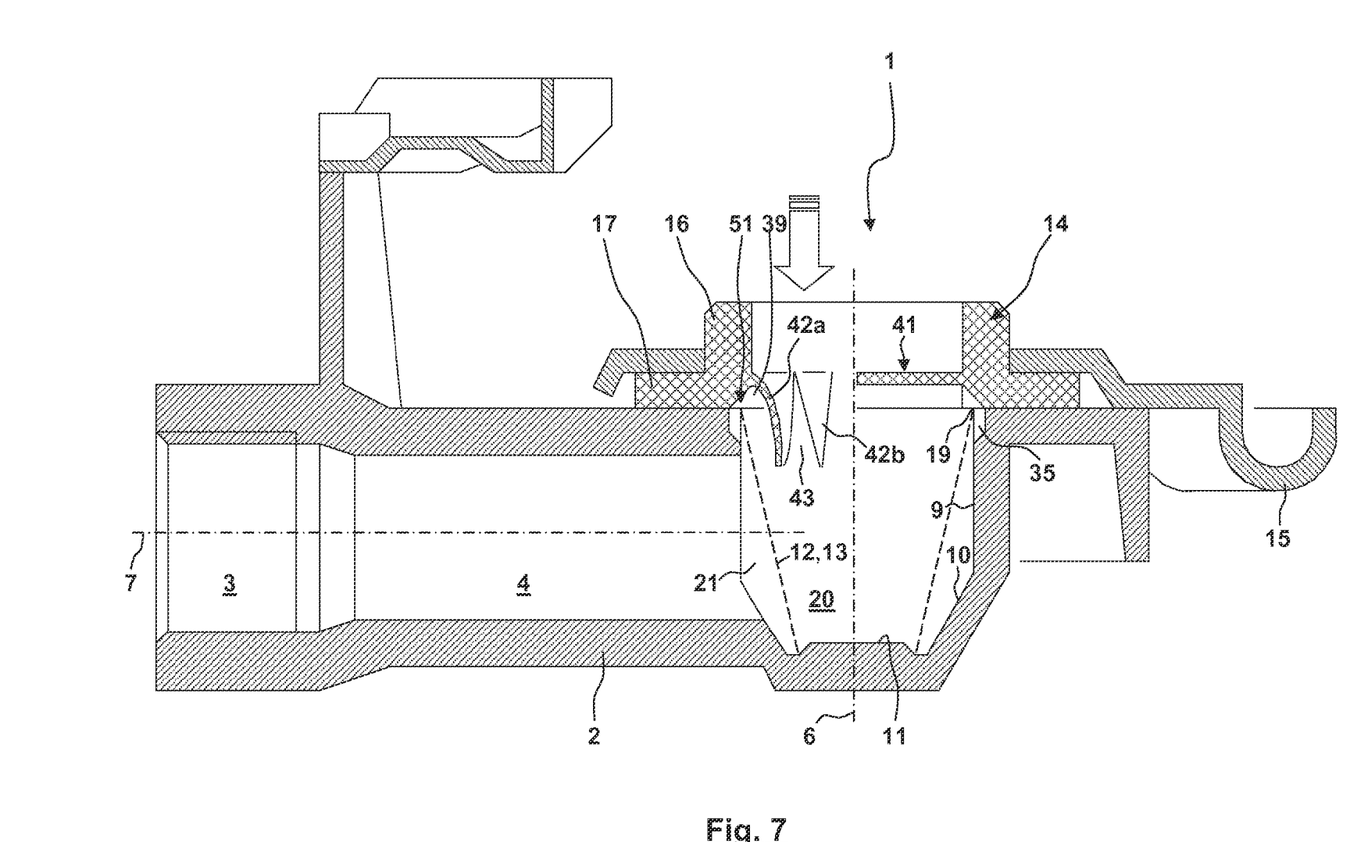

FIGS. 6 and 7 show an embodiment, in which the housing 2, corresponding to the embodiments according to FIGS. 3 and 4, is provided with a preferably annular recess 35. The seal 14 is formed differently here: As can be identified in FIG. 8, an elastic guiding or passing element 41 extends transverse to the inlet channel 40. The guiding and passing element 41 is integrally formed by the seal 14. Here, the guiding or passing element 41 is formed with eight circular segments 41, which have axes oriented radially to the longitudinal axis 6 and which sit as close as possible to one another with their lateral edges. With a flat alignment of the circular segments 42 according to FIG. 8, which corresponds to the unpressurised state of the inlet channel 40, a certain closing function, for example against the entry of contaminants without further compressed air flow, is provided. With the application of compressed air, the circular segments 42 are bent in the direction of flow, as illustrated in FIG. 7, so that compressed air can enter the interior space 20 of the filter insert 13. According to the degree of bending of the circular segments 42, these more or less in the shape of a cone concentrate the compressed air flow in the direction of the longitudinal axis 6. On the other hand, with an increased degree of bending the circular segments 42 enter the interior space 20 of the filter insert 13, similar to the projection 36 according to the exemplary embodiment illustrated in FIG. 4, so that the flow can only reach the by-pass opening 25 and the by-pass channel 26 with a redirection according to FIG. 5. Accordingly, for this embodiment the required redirection depends on the extent of the bending of the circular segments 42. In addition, as illustrated in FIG. 7, with the bending of the circular segments 42 gaps 43 can form between adjacent circular segments 42, through which the compressed air with an altered redirection can cross over to the by-pass opening 25 and the by-pass channel 26. While the annular groove 39 in the seal 14 according to FIG. 4 has an approximately rectangular cross-section, FIG. 7 shows an annular groove 39 with a triangular cross-section, wherein the corner responsible for the redirection is rounded, which can automatically result from the bending line of the ring segments 42. The seal 14 can be provided with ribs 44 which can be pressed from above onto the edge 19 of the filter insert 13 for the purpose of fixing them in place. In FIG. 7, in the left half plane the circular segments 42 are illustrated being flowed through and bent, while those in the right half plane are illustrated with no flow through and unbent.

Figure 8:
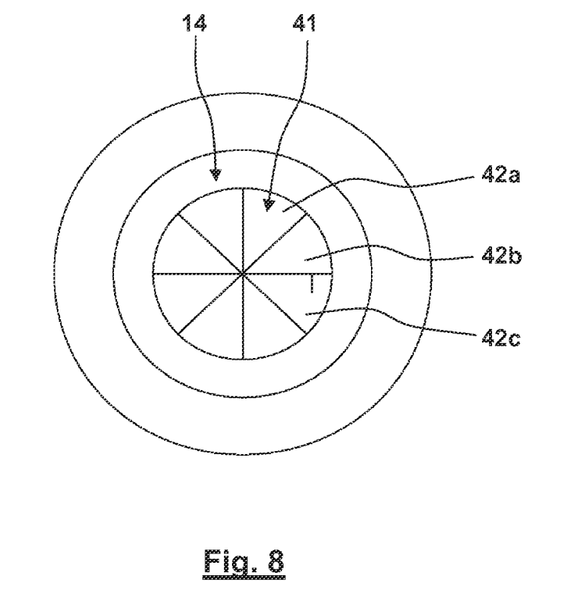
FIG. 8 shows a top view of a seal which is inserted into the coupling head according to FIGS. 6 and 7.
Figure 9:
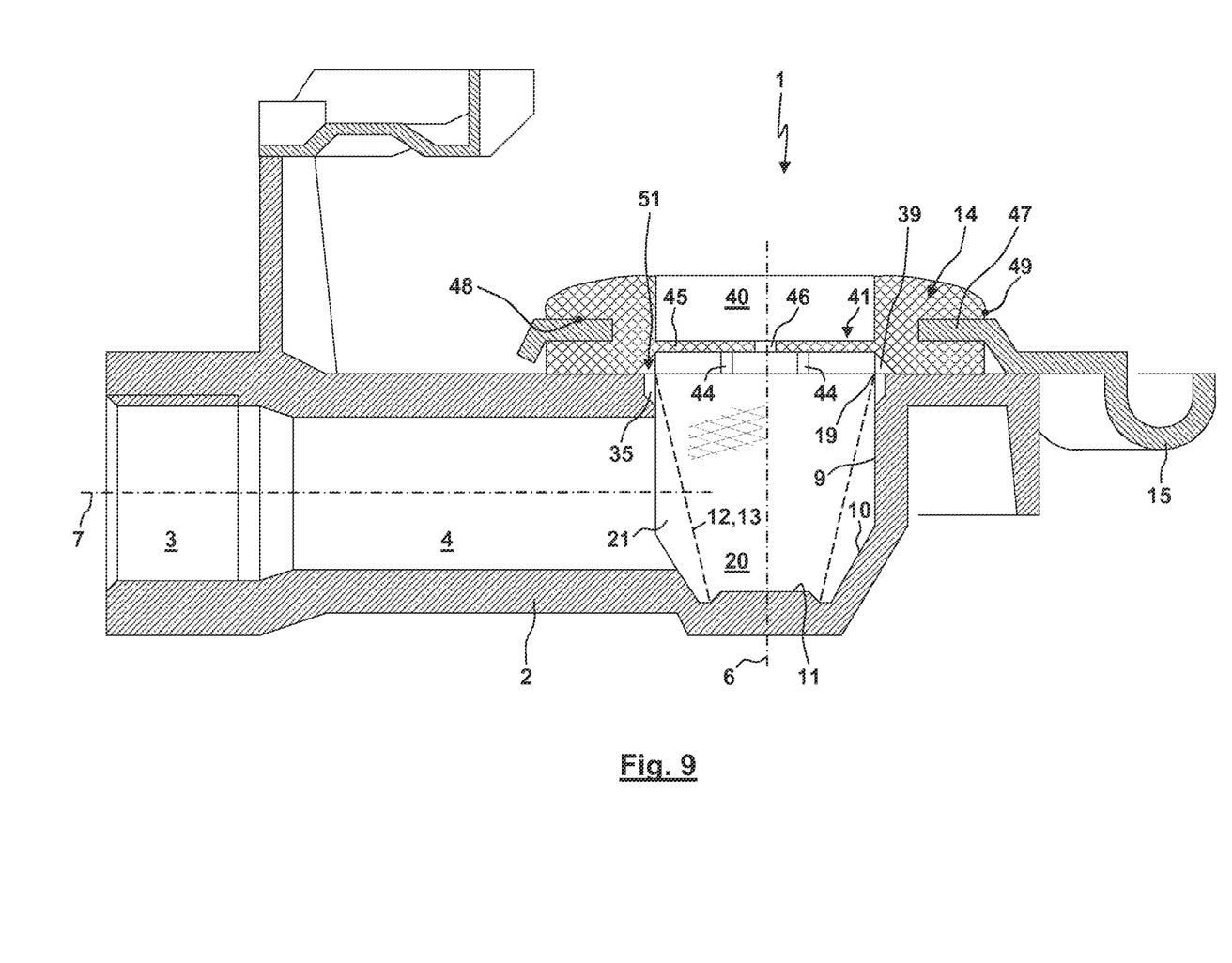
FIG. 9 shows a further embodiment of a coupling head according to the invention in a vertical section.
Figure 10:
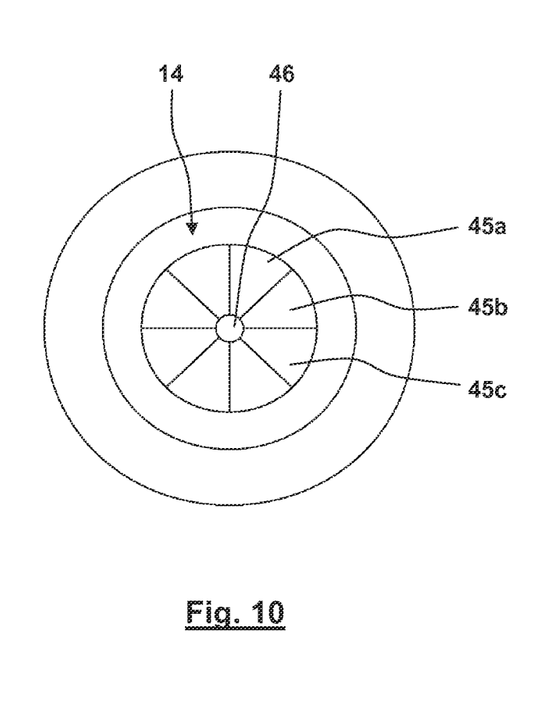
FIG. 10 shows a top view of a seal which is inserted into the coupling head according to FIG. 9.

In the exemplary embodiment illustrated in FIGS. 9 and 10, the function of the seal 14 which is emphasised here is designed corresponding to the exemplary embodiment according to FIGS. 6 to 8, but with the difference that the guiding or passing element 42 in this case is formed with ring segments 45. The ring segments 45 radially on the inner side and also without elastic bending delimit a circular, permanently open opening cross-section 46. While for the previous exemplary embodiments the guide element 15 was fitted or pressed from above onto the leg 17 of the seal 14, for the exemplary embodiment according to FIG. 9 a ring-shaped connection region 47 is accommodated and held in an annular groove 48 of the enveloping surface 49 of the seal 14. This represents a form of the seal 14 and of the connection with the guide element 15 as is in particular employed in the USA.

Figure 11:
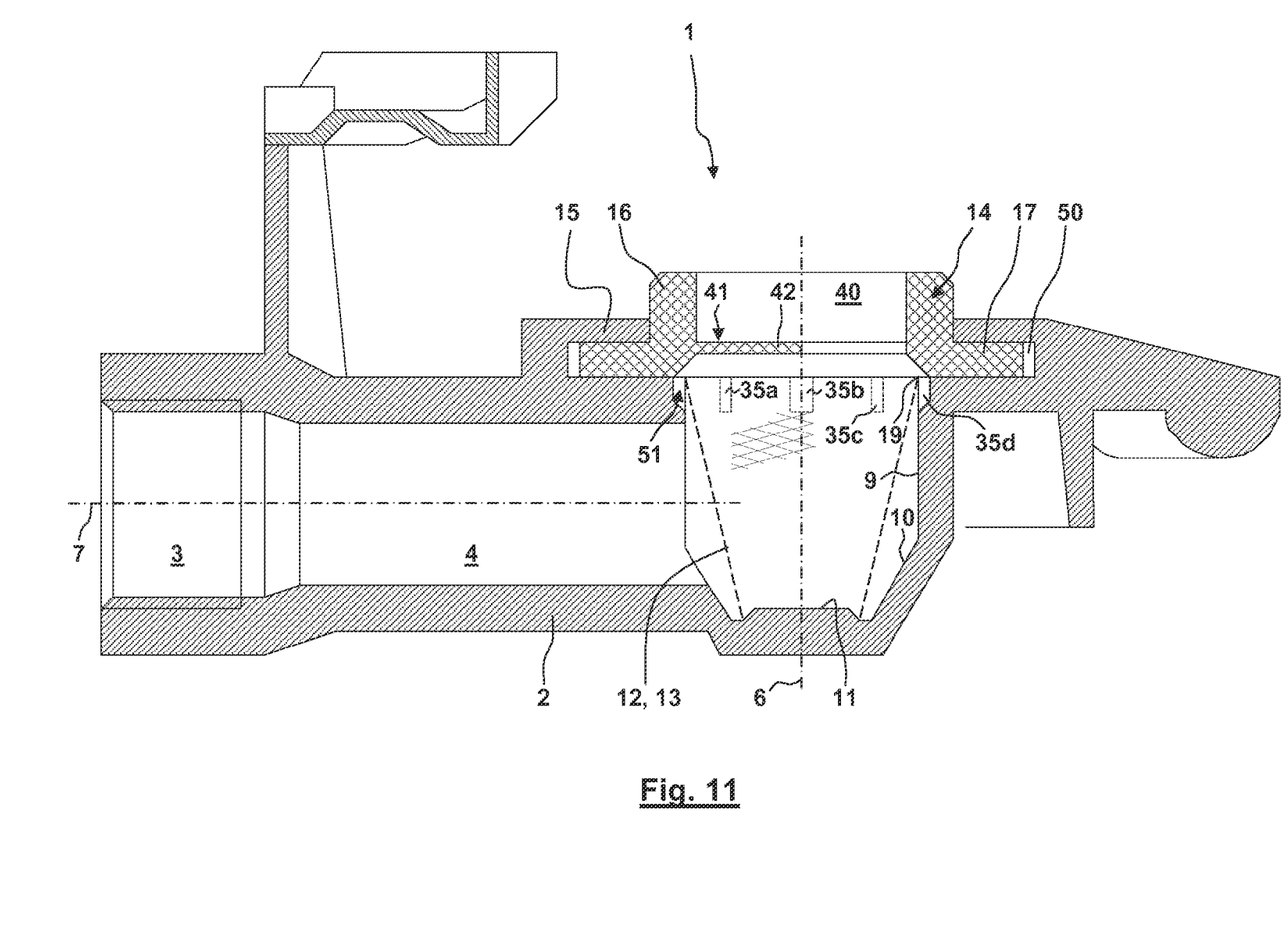
FIG. 11 shows a further embodiment of a coupling head according to the invention in a vertical section

FIG. 11 shows an exemplary embodiment, in which the guide element 15 is integrally formed with the housing 2. In order to accommodate the seal 14, the housing 2 here has an undercut 50 in a form of a circumferential groove which can, for example, be manufactured by machining. When being fitted, preferably the seal 14 is inserted by elastic deformation with the leg 17 into the undercut 50. In addition, it can be identified in FIG. 11 that the recess 35 of the housing does not have to be circumferentially formed for the purpose of forming the by-pass 51. Instead, a plurality of recesses 35a, 35b, etc. distributed over the circumference is used here.

Preferably, the diameters of the filter insert 13 are dimensioned in such a way that with a regularly occurring exchange of the seal 14 the filter insert 13 is arranged unfixed in the chamber 5 and can be taken out without difficulty for cleaning or replacement. A seal change of this kind can take place without further components of the coupling head 1 other than the guide element 15 and/or the seal 14 having to be disassembled.

A by-pass 51 is formed with the recesses 23, undercuts 24, chambers 34, by-pass channels 26, by-pass openings 25, recesses 35 and/or a section of the cross-over space 21. The contaminants in the compressed air can be of any kind, for example in the form of particles, dirt, drops or vapour. The edge 19 of the filter insert 13 forms a separating element for dividing the compressed air flows into a first flow in the direction of the filter element 12, on the one hand, and into a second flow through the by-pass 51, on the other hand. Here, the edge 19 delimits radially on the inner side the by-pass opening(s).

It is understood that the present invention can also comprise embodiments with other redirections of the compressed air to eliminate the contaminants, wherein a repeated redirection back and forth can also take place, and wherein labyrinthine guiding of the compressed air can also take place. Here, the redirection to isolate contaminants can take place upstream from the by-pass opening, i.e. outside the by-pass itself, and/or inside the by-pass.

For the illustrated exemplary embodiments, the at least one by-pass 51 or the at least one by-pass channel 26 is formed with a recess or undercut 24 of the seal 14 and/or of the housing 2, while the filter insert 13 has a circumferential edge 19 which delimits the by-pass 51 or by-pass channel 26. It is quite possible for the at least one by-pass channel 26 or at least one by-pass 51 to be formed by the filter element 12 or the filter insert 13, without the seal 14 and/or the housing 2 having a recess or undercut for this purpose. To simply name an example, depressions oriented in the axial direction can be formed in the edge 19 of the filter insert 13 to form the by-pass 51. It is also possible for radial recesses, holes or the like to be provided in the upper end region of the filter insert 13

Many variations and modifications may be made to the preferred embodiments of the invention without departing substantially from the spirit and principles of the invention. All such modifications and variations are intended to be included herein within the scope of the present invention, as defined by the following claims.

I claim:

1. A coupling head for a commercial vehicle comprising a glad hand with:
   a) a filter element with compressed air flowing therethrough;
   b) a permanently open by-pass which bypasses the filter element; and
   c) a connection region that pneumatically couples a tractor with a trailer of the commercial vehicle or pneumatically couples another trailer with the trailer of the commercial vehicle.

2. The coupling head according to claim 1, wherein a guiding surface guides the compressed air in a guiding direction towards said filter element and said by-pass comprises a by-pass opening arranged so that the compressed air only reaches said by-pass opening from said guiding surface by being redirected from said guiding direction.

3. The coupling head according to claim 2, wherein said by-pass opening is arranged in a region of an undercut.

4. The coupling head according to claim 3, wherein said undercut is formed by a seal.

5. The coupling head according to claim 3, wherein said undercut is formed by a housing.

6. The coupling head according to claim 1, wherein said by-pass is formed with a by-pass channel or a plurality of by-pass channels and/or with a by-pass opening or a plurality of by-pass openings.

7. The coupling head according to claim 6, wherein said by-pass channels or by-pass openings are distributed over the circumference of said filter element.

8. The coupling head according to claim 6, wherein said by-pass channel or said by-pass opening extends along the whole circumference of said filter element.

9. The coupling head according to claim 8, wherein said circumferential by-pass channel is delimited radially on the inner side by said filter element and radially on the outer side by a seal and/or a housing.

10. The coupling head according to claim 6, wherein a separating element is provided which separates a flow of the compressed air into said at least one by-pass channel from a flow of the compressed air towards said filter element.

11. The coupling head according to claim 10, wherein said separating element is formed by an edge of said filter element.

12. The coupling head according to claim 1, wherein for an at least partly blocked filter element, compressed air flows through said by-pass from a flow in said guiding direction via a redirection region, a turning region and a counter redirection region.

13. The coupling head according to claim 1, wherein for an at least partly blocked filter element, the compressed air flows through said by-pass in an S-shaped flow.

14. The coupling head according to claim 1, wherein the compressed air flowing through said by-pass flows around a protrusion, an edge or a projection which extends into said filter element.

15. The coupling head according to claim 13, wherein the compressed air flowing through said by-pass flows around a protrusion, an edge or a projection which extends into said filter element.

16. The coupling head according to claim 1, wherein
   a) an elastic guiding or passing element is elastically deformed and
   b) opened or further opened from an open state with reduced opening cross section by the flow of the compressed air.

17. The coupling head according to claim 13, wherein
   a) an elastic guiding or passing element is elastically deformed and
   b) opened or further opened from an open state with reduced opening cross section by the flow of the compressed air.

18. The coupling head according to claim 17, wherein a redirection of the compressed air on the way to said by-pass opening is dependent on an elastic deformation of said guiding or passing element.

19. The coupling head according to claim 18, wherein said guiding or passing element is formed with elastic circular segments or ring segments.

20. The coupling head according to claim 18, wherein said guiding or passing element is formed as an integral part of said seal.

21. The coupling head according to claim 1, wherein a seal is designed according to ISO 1728 for coupling heads.

22. The coupling head according to claim 1, wherein
   a) said filter element is secured in place by a seal; and
   b) when said seal is detached, said filter element can be removed from said coupling head without further disassembling steps.

23. The coupling head according to claim 1, wherein a collecting space is provided for contaminants in the compressed air.

* * * * *